Aug. 23, 1938.                D. L. McNEAL                2,128,053
                            BRAKE CONTROL MEANS
                           Filed Dec. 15, 1936            2 Sheets-Sheet 2
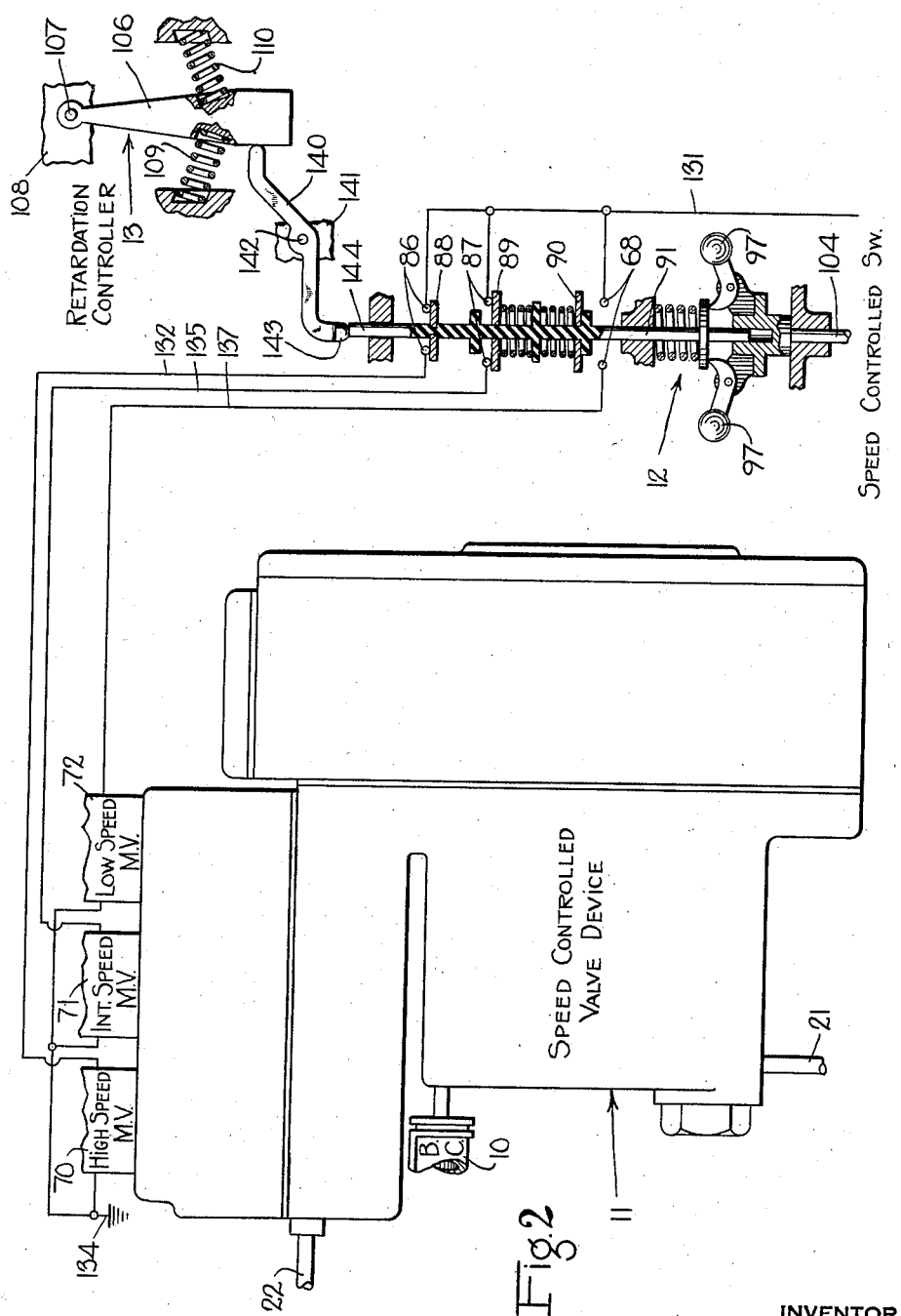
INVENTOR
DONALD L. McNEAL
BY *Wm. M. Cady*
ATTORNEY Patented Aug. 23, 1938

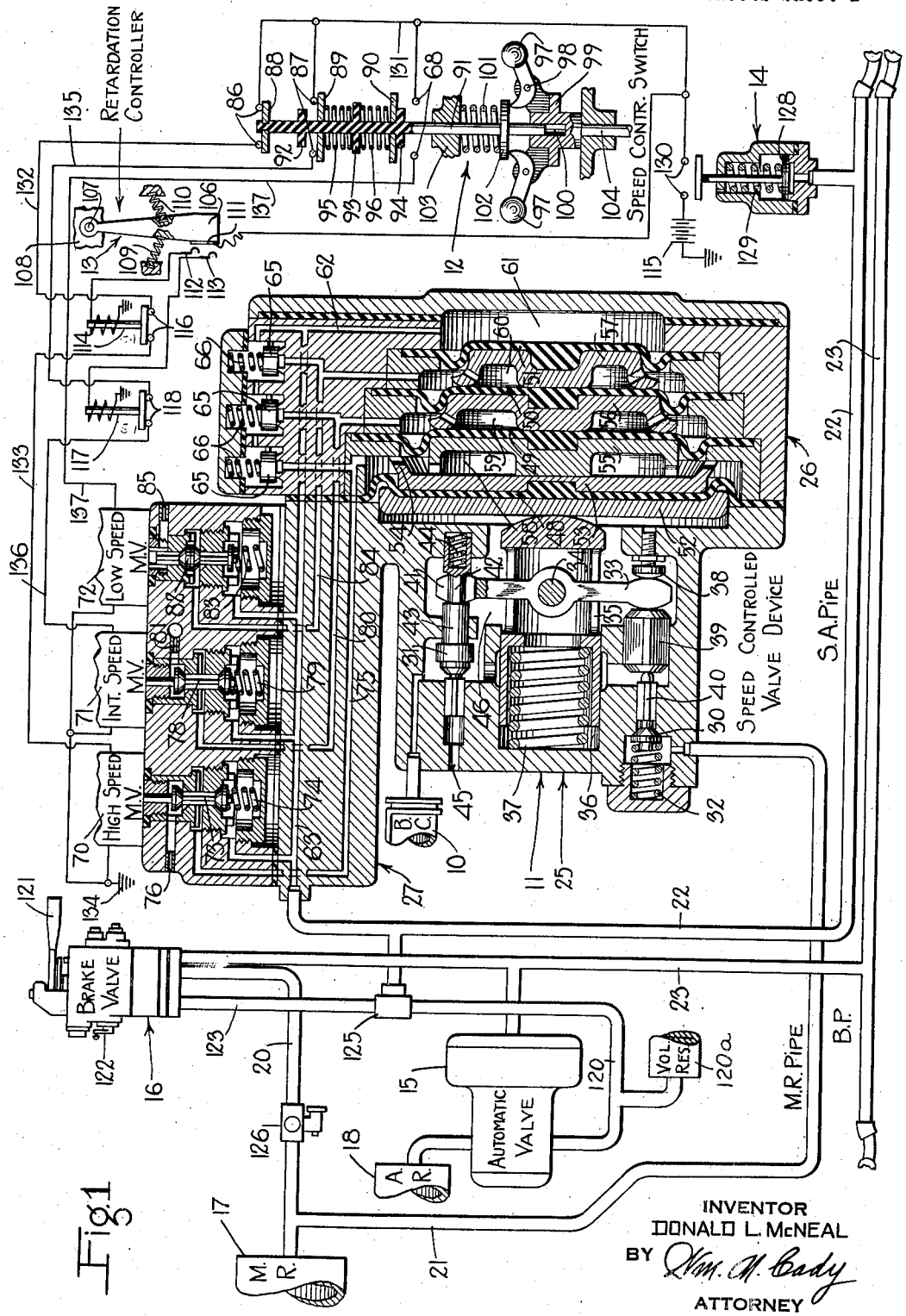

2,128,053

UNITED STATES PATENT OFFICE 2,128,053

BRAKE CONTROL MEANS

Donald L. McNeal, Wilkinsburg, Pa., assignor to The Westinghouse Air Brake Company, Wilmerding, Pa., a corporation of Pennsylvania Application December 15, 1936, Serial No. 115,943

30 Claims. (Cl. 303—21)

This invention relates to brake control means intended principally for high speed trains, and more particularly to means for controlling the brakes on high speed trains with respect to both speed and the rate of retardation of the train.

In the operation of trains at extremely high speeds, as, for example, in the neighborhood of one hundred miles per hour, or more, a problem of great practical importance is the stopping of such trains in reasonably short distances. The brakes employed on such trains are usually of the familiar fluid pressure operated type. If the brakes are applied to a relatively high degree when the train is travelling at a relatively high speed, then due to the fact that the coefficient of friction between the brake shoes and the wheel treads increases as the vehicle speed diminishes, the degree of braking must be diminished or otherwise wheel sliding will undoubtedly result. Wheel sliding is objectionable not only because flat spots are worn on the wheel treads, but also because the retarding effect of a sliding wheel is less than that of a rolling wheel, which results in lengthening the stop.

In order to stop the train in the shortest possible distance, all wheels must be kept rolling so that the maximum possible braking effect is produced by each wheel. Due to the fact that the coefficient of friction between the brake shoes and wheel treads increases as the speed of the train diminishes, it is desirable that the degree of braking force be reduced as nearly as possible in proportion to the increase in coefficient of friction.

There has heretofore been described and claimed in the pending application of Ellis E. Hewitt, Serial No. 108,939, filed November 3, 1936, which application is owned by the assignee of the present application, a brake equipment for so controlling the degree of application of the brakes as to produce very short stops. In that brake equipment, a retardation controller device and a speed controlled device have been so combined as to permit, throughout a stop, the maximum degree of braking possible under assumed track conditions. Further, in that braking equipment, the speed controlled device functions to establish an upper nominal limit (below the maximum possible) for brake cylinder pressure for each of several chosen speed ranges, while the retardation controller device controls brake cylinder pressures above the nominal limit, thereby permitting the maximum possible brake cylinder pressure for assumed track conditions, with a minimum danger of wheel sliding.

In the present invention, I contemplate a brake equipment which approaches this problem from a somewhat different angle. I propose to provide a speed controlled device which will establish a maximum upper limit for brake cylinder pressure for each of a number of given speed ranges, and also provide a retardation controller device which is operable, in the event that an excessive rate of retardation occurs while the train is traveling at a speed within one of the said speed ranges, to reduce the upper limit of brake cylinder pressure from that established by the speed controlled device for that speed range, to a limiting value normally established for a lower speed range.

Accordingly, it is a principal object of the present invention to provide a brake equipment wherein a speed controlled device functions by and in response to the speed of the vehicle, or train, to control the upper permissible limit of brake cylinder pressure, and wherein a device operated by and in response to the rate of retardation of the vehicle or train functions to reduce brake cylinder pressure below this limit upon excessive rates of retardation.

In the aforementioned Hewitt application, the brake equipment there illustrated comprises a speed controlled electric switch device and a retardation controller device of the pneumatic type. In the present invention, I contemplate the employment of a speed controlled switch device and a retardation controller device of the electric type, and so arranged that either device may function to control brake cylinder pressure, depending upon whether there is a predetermined change in the speed of the vehicle, or train, or whether there is produced an excessive rate of retardation of the vehicle, or train.

As before referred to, it is contemplated that the speed controlled means will function to establish an upper limit for brake cylinder pressure for each of a number of chosen speed ranges. That is to say, as the speed of the vehicle or train diminishes, a new limit for brake cylinder pressure is established as the vehicle or train passes from one speed range to the next lower speed range. It may happen that for changing track conditions, or for varying load conditions in the train, the maximum permissible brake cylinder pressure for the speed range in which the vehicle or train is traveling at a given time would be so high that, unless greatly reduced, there will be produced excessive rates of retardation, with consequent increased danger of wheel sliding.

Accordingly, therefore, it is a further object of the present invention to provide a brake equipment of the character hereinbefore indicated, wherein the retardation controller device functions at one particular rate of retardation, while the vehicle or train is within a given speed range, to reduce the upper limit of brake cylinder pressure from that permissible in said given speed range to the limiting value which is normally established for the next lower speed range, and in the event that this reduction in brake cylinder pressure does not produce the desired decrease in the rate of retardation, but the rate continues to increase, then functions at a higher rate of retardation to reduce the upper limit of brake cylinder pressure to a still lower value, corresponding to that normally established by the speed controlled device for a speed range lower than that adjacent the one in which the vehicle is traveling at that time.

Further and more specific objects of the invention, dealing with particular arrangements of devices and apparatus, will be more fully understood from the following description of two embodiments of the present invention, which two embodiments are illustrated in the attached drawings, wherein, Fig. 1 illustrates in schematic and diagrammatic form an embodiment of the invention as adapted for a single car in a train, as, for example, the head end or control car.

Fig. 2 shows a modification of the brake system illustrated in Fig. 1, wherein a single set of contacts is jointly controlled by a centrifuge device and a retardation controller device.

Referring now first to Fig. 1, the brake equipment may comprise one or more brake cylinders 10, a speed controlled valve device 11 for controlling the supply of fluid under pressure to and its release from the brake cylinders 10, a speed controlled switch device 12, a retardation controller device 13, a fluid pressure operated switch device 14, an automatic valve device 15, and a manually operated brake valve device 16. The various reservoirs may comprise a main reservoir 17 and an auxiliary reservoir 18.

The various supply and control pipes may comprise a feed valve pipe 20, a main reservoir pipe 21, a straight air pipe 22 and a brake pipe 23.

Attention is called to the fact that the speed controlled valve device 11 is essentially the same as that described and claimed in the pending application of Ellis E. Hewitt, Serial No. 88,098, filed June 30, 1936, and assigned to the assignee of the present application.

Considering now these parts more in detail, the speed controlled valve device 11 comprises a valve section 25, a diaphragm section 26, and a magnet valve section 27.

The valve section 25 comprises a supply valve 30 and a release valve 31. The supply valve 30 is urged toward a seated position by a spring 32, and is adapted to be unseated upon clockwise rotation of a lever 33. The lever 33 is pivotally mounted on a pin 34 carried by a slidable member 35, which is slidable in a bore 36 in the valve section 25. The slidable member 35 is biased to the right by a spring 37. When the slidable member 35 is in its extreme right hand position, the lower end of the lever 33 rests against an adjustable stop 38, but when the slidable member 35 is actuated to the left the lever 33 may be rotated in a clockwise direction, whereupon the lower end shifts a plunger 39 to the left, and the plunger unseats the valve 30 by engagement with its fluted stem 40.

The upper end of the lever 33 is adapted to actuate the release valve 31. The upper end of the lever 33 is bifurcated at 41, and embraces a reduced portion 42 of a stem 43. The left end of the stem 43 is secured to or integral with the release valve 31, while the right end of the stem 43 is recessed to receive a spring 44, which functions to cushion movement of the stem to the right.

The parts of the valve section 25 are illustrated in their release positions, and are held there by virtue of the initial tension on the spring 37. It will be noted that the supply valve 30 is held seated by spring 32, while the release valve 31 is held unseated by virtue of the action of the lever 33. When the slidable member 35 is actuated to the left, the lever 33 will move with it, and first fulcrum about its lower end to seat release valve 31. Next, it will fulcrum about its upper end to unseat the supply valve 30. Seating of the release valve 31 closes communication between the brake cylinder 10 and an exhaust port 45, while unseating of the supply valve 30 opens communication between the main reservoir pipe 21 and chamber 46, which is at all times open to the brake cylinder 10.

When the slidable member 35 thereafter moves to the right to a position where the supply valve 30 is seated, while the release valve 31 remains seated, the supply of fluid under pressure to the chamber 46 and brake cylinder 10 is lapped. If the slidable members 35 should then move further to the right, the release valve 31 will be unseated to release fluid under pressure from the brake cylinder 10 to the atmosphere, by way of exhaust port 45.

The diaphragm section 26 comprises a series of diaphragms 48, 49, 50 and 51, arranged in spaced, coaxial relationship. As indicated, these diaphragms diminish in effective pressure areas, in the order enumerated. The diaphragm 48 is provided on one side with a follower plate 52 and on the other side with a follower plate 53. The follower plate 53 is provided with an annular and apertured flange 54 for effecting spacing of the diaphragm with respect to the enclosing casing.

Diaphragms 49, 50 and 51 are provided with follower plates 55, 56 and 57, respectively, it being noted that each of these follower plates is provided with an annular and axially extending flange, for the purpose of maintaining a predetermined spacing between the diaphragms, without providing a rigid connection therebetween.

The diaphragms 48 and 49 define therebetween a chamber 58, and the diaphragms 49 and 50 define therebetween a chamber 59. In a similar manner, the diaphragms 50 and 51 define therebetween a chamber 60. To the right of the diaphragm 51 is a chamber 61. The chamber 61 is connected by passages 62 and 63 to the straight air pipe 22.

Disposed between each of the chambers 58, 59 and 60 and the passage 62 leading to the straight air pipe 22, is a check valve 65, biased to a seated position by a light spring 66. Each of these check valves is so arranged as to provide a one-way communication from each chamber to the passage 62, but operable to prevent the flow of fluid in the opposite direction. The purpose of these check valves is to permit a decrease of pressure in each of the chambers 58, 59 and 60 upon a decrease of pressure in the straight air pipe, as will more fully appear hereinafter.

The magnet valve section 27 comprises three electromagnets 70, 71 and 72, designated respectively as high speed magnet valve, intermediate speed magnet valve, and low speed magnet valve.

The high speed magnet valve comprises a double beat valve 73, which is urged toward an upper seated position by a spring 74, and which is actuated to a lower seated position upon energization of the electromagnet 70. In its upper seated position, as illustrated, the double beat valve 73 opens communication between a passage 75 leading to the chamber 58, and an atmospheric communication containing a choke or restriction 76. In its lower seated position the double beat valve 73 closes this communication to the atmosphere, and opens communication between the passage 63 leading to the straight air pipe 22, and the passage 75 leading to the chamber 58.

The electromagnet 71 controls operation of a double beat valve 78. The double beat valve 78 is urged toward an upper seated position by a spring 79, and is actuated to lower seated position upon energization of the electromagnet 71. In its upper seated position, as illustrated, the double beat valve 78 opens communication between a passage 80 leading to the chamber 59, and an exhaust communication containing a restriction or choke 81. In its lower seated position, the double beat valve 78 closes this communication to the atmosphere, and opens communication between the passage 63 and the passage 80.

The electromagnet 72 controls the operation of double beat valve 82. The double beat valve 82 is urged toward upper seated position by spring 83, and is adapted to be actuated to lower seated position upon energization of the electromagnet 72. In its upper seated position, as illustrated, the double beat valve 82 opens communication between a passage 84 leading to the chamber 60, and the passage 63 leading to the straight air pipe 22. In its lower seated position, the double beat valve 82 closes this communication and opens communication between the passage 84 and the atmosphere by way of a choke or restriction 85.

It will thus be observed that the three electromagnets 70, 71 and 72 control, respectively, the supply of fluid under pressure to and its release from the three diaphragm chambers 58, 59 and 60.

It will also be observed that, in the event that the three electromagnets 70, 71 and 72 have closed communication between the passage 63 and each of the chambers 58, 59 and 60, the pressure in these three chambers may be reduced upon a reduction of pressure in the passage 63, by the unseating of the check valves 65, due to the overbalancing pressure acting below each of these check valves, it being understood that the spring 65 is merely a light biasing spring.

Considering now the speed controlled switch device 12, this device comprises essentially three sets of stationary contacts 86, 87 and 68, adapted to be engaged respectively, by movable contacts 88, 89 and 90. The three movable contacts 88, 89 and 90 are operatively related to a stem 91, preferably composed of some insulating material, as, for example, Micarta or Bakelite. The contact 88 is preferably rigidly secured to the stem 91, while the two contacts 89 and 90 are loosely disposed on the stem.

The stem 91 has arranged in spaced relationship thereon three flanges or shoulders 92, 93 and 94. Also disposed on the stem 91 between the contact 89 and the shoulder 93 is a spring 95, and similarly disposed on the stem between the shoulder 93 and the contact 90 is a like spring 96.

The shoulders 92, 93 and 94, and the springs 95 and 96, are so arranged that when the stem 91 is rotating at a speed corresponding to any vehicle speed in an upper speed range, as, for example, between sixty and one hundred miles per hour, the movable contacts will be positioned with respect to the stationary contacts as illustrated in Fig. 1. When, however, the stem 91 is rotating at a speed corresponding to any speed in an intermediate speed range of the vehicle, as, for example, between thirty-five and sixty miles per hour, the movable contact 88 will have disengaged from the stationary contacts 86, while the contact 89 will remain in engagement with the contacts 87. For this same speed range the contact 90 will be out of engagement with the stationary contacts 68.

When the stem 91 is rotating at a speed corresponding to any vehicle speed within a low speed range, as, for example, between fifteen and thirty-five miles per hour, the contact 89 will have disengaged from the stationary contacts 87, while the contact 90 will remain out of engagement with the stationary contacts 68.

When the stem 91 is rotating at a speed corresponding to any vehicle speed below fifteen miles per hour, the contacts 90 will have engaged the stationary contacts 68. The contacts 89 and 88 will have, of course, previously disengaged from their respective stationary contacts.

Vertical movement of the stem 91 is governed by a centrifuge device comprising fly-ball weights 97, each of which is pivotally mounted on a pin 98 secured to a rotatable member 99. The lower end of the stem 91 projects into a coacting recess 100 in the rotatable member 99, and the stem is urged downwardly by action of a spring 101 acting between a flange 102 on the stem and a portion 103 of a supporting casing. The rotatable member 99 is adapted to be driven through connection of an associated shaft 104 with some part of the vehicle which rotates at a speed corresponding to vehicle speed, as, for example, an axle or a wheel.

Considering now the retardation controller device 13, this device comprises a pendulum 106 pivotally mounted on a pin 107, preferably through ball bearings or other anti-friction means, the pin 107 being carried by a supporting casing 108. The pendulum 106 is biased to a neutral position by two springs 109 and 110 acting on opposite sides thereof between the pendulum and portions of the casing 108.

The retardation controller device is preferably positioned on the vehicle such that, assuming the vehicle to be traveling to the left, as illustrated in Fig. 1, the pendulum 106 will be moved to the left during deceleration a distance proportional to the rate of deceleration.

Carried by and insulated from the pendulum 106 is a contact 111. This contact 111 is adapted to engage a stationary, resilient contact 112 upon movement of the pendulum 106 to the left in response to a predetermined rate of retardation of the vehicle, and to engage a similar stationary contact 113 upon movement of the pendulum in response to a predetermined higher rate of retardation of the vehicle.

When the contact 111 engages the contact 112, a relay 114 is energized from a battery 115, through the circuit shown, and the relay will then open its contacts 116. When the contact 111 engages the contact 113, a second relay 117 is energized also from the battery 115, through the circuit shown, and this relay will then open its contacts 118.

The automatic valve device 15 is preferably of conventional design, and may be understood to be any standard or familiar type of automatic valve device, as, for example, an ordinary triple valve device, which will respond to a reduction in brake pipe pressure at either a service rate or an emergency rate, to supply fluid under pressure from the auxiliary reservoir 18 to a pipe 120 having the usual volume reservoir 120a connected thereto; and which will function upon restoration of brake pipe pressure to release fluid under pressure from the pipe 120 to the atmosphere.

The brake valve device 16 may also be of conventional design, but I prefer to employ the type of brake valve device described and claimed in the pending application of Ellis E. Hewitt, Serial No. 105,659, filed October 15, 1936. A particular feature of this type of brake valve device is that automatic or straight air applications of the brakes may be controlled by movement of its handle 121 in the same service application zone. This is accomplished by providing on the brake valve device a selector 122 which is movable between an automatic position and a straight air position.

When the selector 122 is in the straight air position, the brake valve device is conditioned to control applications of the brakes by straight air operation, and when in the automatic position to control applications of the brakes by automatic operation. Regardless of what position the selector 122 is in at the time the handle 121 is in its release position, a control pipe 123 is connected to the atmosphere, while the brake pipe 23 is connected to the feed valve pipe 20. When the selector 122 is in the straight air position, and the handle 121 is moved into the service application zone to any position, communication between the control pipe 123 and the atmosphere is cut off, and fluid under pressure is supplied from the feed valve pipe 20 to the pipe 123 to a degree dependent upon the extent of movement of the handle 121 into the service application zone. During this movement of the handle the brake pipe 23 remains in communication with the feed valve pipe 20.

When the selector 122 is in the automatic position, movement of the handle 121 to a position within the same service application zone as before results in venting the brake pipe 23 to the atmosphere at a service rate. For this movement of the handle 121 the control pipe 123 remains in communication with the atmosphere.

Regardless of what position the selector 122 is in when the handle 121 is moved to an emergency position, the brake pipe 23 is vented to the atmosphere at an emergency rate, and at the same time fluid under pressure is supplied to the pipe 123 to a maximum degree.

It will be observed that disposed between the pipes 120 and 123 is a double check valve device 125. This valve device is preferably of conventional design, comprising a slidable valve within which is subject on one side to the pressure of fluid in the pipe 123 and on the other side to the pressure of fluid in the pipe 120. As is usual, it will function to open communication between either of pipes 120 and 123 and the straight air pipe 22, depending upon whether the pressure is the greater in the one pipe or the other.

Disposed between the feed valve pipe 20 and the main reservoir 17 is a feed valve device 126. This valve device is also preferably of conventional design, and functions, as is usual, to supply fluid under pressure from the main reservoir 17 to the pipe 20 at some chosen pressure.

The operation of this embodiment of my invention will now be described.

Running condition

When the vehicle is running under power, or is coasting, the brake valve handle 121 is maintained in the release position. With the main reservoir 17 fully charged, fluid under pressure will be delivered at feed valve pressure to the feed valve pipe 20, and will flow from this pipe to the brake valve device 16. Since in release position of the handle 121 the brake pipe 23 is in communication with the feed valve pipe 20, it follows that the brake pipe will be charged to feed valve pressure. From the brake pipe fluid under pressure will flow to the automatic valve device 15, and through the communication established within this valve device to the auxiliary reservoir 18, thus charging this reservoir to brake pipe pressure.

From the main reservoir 17 fluid under pressure will be delivered to the main reservoir pipe 21, from whence it will flow to the chamber to the left of the supply valve 30 in the speed controlled valve device 11. Thus the entire brake system will be charged and is ready for operation.

As has been previously indicated, applications of the brakes may be effected by either straight air operation or by automatic operation. In addition, the maximum degree to which the brakes may be initially applied at any given time depends upon the speed of the vehicle at that time, so that in describing the operation of the brake system illustrated reference will be had to the speed ranges heretofore referred to in connection with the description of the speed controlled switch device 12. It will be assumed that the maximum speed of the vehicle is one hundred miles per hour.

In order to further facilitate the understanding of the operation of the embodiments disclosed, specific fluid pressures will be assumed. For example, it will be assumed that the main reservoir 17 is maintained charged to a pressure value in excess of one hundred pounds (per square inch), as, for example, one hundred and twenty or one hundred and twenty-five pounds; and that the feed valve device 126 will deliver fluid to the feed valve pipe 20 at a pressure of one hundred and ten pounds. It will also be assumed that the maximum pressure which can be delivered to the control pipe 123 as a result of movement of the brake valve handle 121 to the maximum service application position, or to the emergency position, is approximately one hundred pounds per square inch.

Straight air service applications above sixty miles per hour

When the vehicle is traveling at a speed within the high or upper speed range, that is, between the speeds of sixty and one hundred miles per hour, as hereinbefore referred to, the parts of the speed controlled switch device 12 will be in the positions as illustrated in Fig. 1. That is to say, the flyball weights 97 will have been moved outwardly far enough, for any speed between sixty and one hundred miles per hour, to have caused the contact 88 to engage the contacts 86, and the contact 89 to have engaged the contacts 87. It will be noted that for this speed range the contact 90 is out of engagement with the stationary contacts 68.

Now if it is desired to effect a straight air service application of the brakes, the operator first makes certain that the selector 122 is in the straight air position, and then moves the brake valve handle 121 into the service application zone to a degree according to the desired degree of application of the brakes. It will be assumed that the handle 121 is moved to the extreme end of the service application zone, corresponding to a full service application, in which event fluid under pressure will be supplied to the control pipe 123 until the pressure in this pipe attains a maximum value of one hundred pounds.

Fluid under pressure in the control pipe 123 flows to one side of the double check valve device 125, where the valve therein is shifted to its lower position, and fluid under pressure then flows to the straight air pipe 22.

Fluid under pressure supplied to the straight air pipe 22 flows to the fluid pressure operated switch device 14, where at a low pressure piston 128 is actuated upwardly, against the bias of spring 129, to close contacts 130. Closing of these contacts energizes both the high speed electromagnet 70 and the intermediate speed electromagnet 71. The circuit to the high speed electromagnet 70 includes, beginning from battery 115, contacts 130, conductor 131, contacts 86 and 88, conductor 132, relay contacts 116, and conductor 133, the return circuit from the electromagnet 70 including ground connection 134. The circuit to the intermediate speed electromagnet 71 includes, beginning at battery 115, contacts 130, conductor 131, contacts 87 and 89, conductor 135, relay contacts 118, and conductor 136, the return circuit to the battery being also by way of ground connection 134.

With both electromagnets 70 and 71 energized, both double beat valves 73 and 78 will be actuated to lower seated position, to open communication between the passage 63 and each of chambers 58 and 59. It will be observed that the low speed electromagnet 72 is not energized at this time.

From the straight air pipe 22 fluid under pressure also flows to the passage 63, and from this passage it now flows to each of the chambers 58, 59, 60 and 61, the flow to the chamber 58 being by way of the open lower seat of the double beat valve 73, flow to the chamber 59 being by way of the open lower seat of the double beat valve 78, and flow to the chamber 60 being by way of the open lower seat of the double beat valve 82. The chamber 61 is, of course, in direct communication with the passage 63 by way of passage 62.

The flow to the chambers 58, 59, 60 and 61 takes place at a fairly rapid rate, and the pressure builds up in each chamber uniformly to the same degree. Since the same pressure will be acting on both sides of each of diaphragms 49, 50 and 51, these diaphragms will remain in the position as illustrated. It will be remembered that these diaphragms are in no way mechanically connected to one another.

However, the fluid pressure in chamber 58 acting upon the right side of the diaphragm 48 flexes this diaphragm to the left, thus shifting the slidable member 35 to the left against the bias of the spring 37. The leftward movement of the slidable member 35 carries with it the lever 33, this lever operating to first seat the release valve 31 and to then unseat the supply valve 30. Fluid under pressure will then flow from the main reservoir pipe 21 to the chamber 46 and from this chamber to the brake cylinder 10. As the pressure in the brake cylinder 10 and chamber 46 builds up, the diaphragm 48 will flex to the right and the slidable member 35 will follow it. When the pressure in chamber 46 is substantially equal to the pressure in the chamber 58, the supply valve 30 will be seated, so that the pressure in chamber 46 and brake cylinder 10 will correspond substantially to straight air pipe pressure and hence according to the position of the brake valve handle 121 in the service application zone.

With the brakes applied to the maximum degree possible for a service application, the vehicle will begin to decelerate at an increasing rate of retardation. The pendulum 106 of the retardation controller device 13 will move to the left a distance proportional to the rate of retardation. In order that the functioning of the retardation controller device may be more clearly understood, the operation of the brake system will be described as though this device were not present, and then the modifying effect of the retardation controller device will be taken up.

As the speed of the vehicle diminishes due to application of the brakes, the speed controlled switch device 12 will at substantially sixty miles per hour operate to disengage the contact 88 from the contacts 86, while holding contact 89 in engagement with contacts 87. Disengagement of contact 88 from contacts 86 will deenergize the high speed electro-magnet 70. Deenergization of this electromagnet results in shifting of the double beat valve 73 to its upper seated position, whereupon communication between the passage 63 and the chamber 58 is closed and the chamber 58 is vented to the atmosphere by way of the choke or restriction 76. As the pressure in chamber 58 diminishes due to the release of fluid under pressure to the atmosphere, the diaphragm 48 will flex to the right, whereupon the release valve 31 will be unseated to release fluid under pressure from the chamber 46. The choke or restriction 76 will, of course, cause the rate of decrease of pressure in the chamber 58 to be gradual, so that there is a gradual reduction in brake cylinder pressure.

Now as the pressure in the chamber 58 gradually reduces, with the pressures in chambers 59, 60 and 61 maintained, a point will be reached where the diaphragm 49 becomes effective in establishing brake cylinder pressure. That is to say, when the brake cylinder pressure has diminished to a value which is to the original brake cylinder pressure (or straight air pipe pressure) as the area of the diaphragm 49 is to the area of the diaphragm 48, the supply to the brake cylinder will be lapped, and even though chamber 58 is completely exhausted to the atmosphere brake cylinder pressure will be under the control of the pressure in chamber 59.

When the speed of the vehicle has diminished to approximately thirty-five miles per hour, the speed controlled switch device 12 will operate to cause contact 89 to disengage from contacts 87, while maintaining contact 90 disengaged from contacts 68. This will result in deenergization of the intermediate speed electromagnet 71. The double beat valve 78 will be then shifted to upper seated position, to release fluid under pressure from diaphragm chamber 59 to the atmosphere, by way of the choke or restriction 81. In a manner similar to that described before, the pressure in the chamber 59 will be gradually reduced, whereupon the valve section 25 will operate to similarly reduce the pressure in brake cylinder 10. Since the area of diaphragm 50 is less than that of diaphragm 49, brake cylinder pressure will, therefore, be reduced to a value which bears a relation to the original or initial brake cylinder pressure (or straight air pipe pressure) substantially the same as the relation between the effective pressure area of diaphragm 50 and the effective pressure area of diaphagm 48.

When the speed of the vehicle has reduced to approximately fifteen miles per hour, the contact 90 of the speed controlled switch device will engage the contacts 68, and thus energize the low speed electromagnet 72, over a circuit which includes, beginning from battery 115, contacts 130, conductor 131, contacts 68 and 90, conductor 137, the low speed electromagnet 72, and the ground connection 134. The low speed electromagnet will then shift the double beat valve 82 to lower seated position, thus releasing fluid under pressure from chamber 60 to the atmosphere by way of the choke or restriction 85. This will result in a further reduction in brake cylinder pressure, in the manner previously described, so that when the chamber 60 has been finally exhausted the pressure in the brake cylinder will have attained a value which is in relation to the original or initial brake cylinder pressure as the area of diaphragm 51 bears to the area of diaphragm 48.

It will thus be seen that the speed controlled switch device 12 is effective in reducing brake cylinder pressure from one limit to another as the speed of the vehicle passes from one speed range to another. The amount that the brake cylinder pressure is reduced in each of the aforedescribed steps depends upon the relative pressure areas of the diaphragms 48, 49, 50 and 51, and it is preferred that these areas be so selected that the permissible brake cylinder pressure during any speed range will be insufficient to produce undesirable wheel sliding for certain assumed track conditions and load conditions of the vehicle.

Considering now the functioning of the retardation controller device 13, and assuming first that the vehicle is traveling between sixty and one hundred miles per hour, if the rate of retardation of the vehicle should reach a value such that the pendulum contact 111 engages the contact 112, the relay 114 will be energized and will, as a consequence, open its contacts 116. The contacts 116 are disposed in the circuit to the high speed electromagnet 70, and opening of these contacts will effect deenergization of this electromagnet although the speed is above sixty miles per hour. Deenergization of the high speed electromagnet 70 will result in exhausting, at a slow rate, the pressure in the diaphragm chamber 58, as previously described. Brake cylinder pressure will, therefore, be placed under the control of the diaphragm 49. The rate of retardation which will cause the contact 111 to engage the contact 112 is preferably that which is considered to be just below the maximum desirable under the assumed track conditions.

If the rate of retardation should exceed the aforementioned desirable rate, while the vehicle is traveling above sixty miles per hour, contact 111 will engage contact 113, and thus energize the relay 117. The relay 117 will open its contacts 118 to effect deenergization of the intermediate speed electromagnet 71. This will result in exhausting the pressure in chamber 59. and thus further reduce brake cylinder pressure by transferring the control to the diaphragm 50. Thus if a predetermined rate of retardation is materially exceeded in the upper speed range the limit for brake cylinder pressure may be stepped downwardly, in either one of two steps, to prevent an excessive rate of retardation, and thereby minimize the danger of excessive wheel sliding.

If, while the vehicle is traveling at a speed between thirty-five and sixty miles per hour, the retardation controller contact 111 should engage the contact 112, no effect upon brake cylinder pressure will result. But, if the rate of retardation should increase to the point where the contact 111 engages contact 113, then the intermediate speed electromagnet 71 will be deenergized to reduce brake cylinder pressure. It is to be noted that in the thirty-five to sixty miles per hour speed range the retardation controller device can reduce the limit for brake cylinder pressure by one step only.

For speeds below thirty-five miles per hour the retardation controller device is not effective, as it is preferred that the diaphragms in the speed controlled valve device 11, and the speed controlled switch device 12, be so designed as to taper off brake cylinder pressure sufficiently to prevent an excessive rate of retardation.

If at any time after a definite pressure has been established in the straight air pipe 22, it is desired to reduce this pressure in order to reduce the degree of application of the brakes, the brake valve handle 121 is moved toward release position as desired. As the pressure in the straight air pipe 22 diminishes one or more of the check valves 65 will unseat to permit the pressure in one or more of the chambers 58, 59 and 60 to reduce in like proportion. It will be seen, therefore, that the operator has at all times full manual control over brake cylinder pressure, even while one of the electromagnets 70, 71 and 72 is effective in reducing brake cylinder pressure.

To effect a full release of the brakes, the handle 121 is returned to release position, whereupon fluid under pressure will be released from the fluid pressure operated switch device 14, and it will open its contacts 130 to render both the speed controlled switch device 12 and the retardation controller device 13 ineffective. At the same time, fluid under pressure will be released from each of the diaphragm chambers to the atmosphere by way of the straight air pipe, so that a full release of brake cylinder pressure will be effected by the valve section 25.

*Straight air service applications between speeds of thirty-five and sixty miles per hour*

If at the time of initiating the application of the brakes the vehicle is traveling above thirty-five miles per hour but below sixty miles per hour, the high speed electromagnet 70 will be deenergized, due to the fact that contact 88 is disengaged from contacts 86. Therefore, when fluid under pressure is supplied to the straight air pipe 22 by operation of the brake valve device 16, it can flow to all of the diaphragm chambers except chamber 58. The degree of brake cylinder pressure which results will be in proportion to straight air pipe pressure in the same relation as the area of the diaphragm 49 bears to the area of diaphragm 48, and will thus not be as great as that attainable at speeds above sixty miles an hour.

As the speed of the vehicle diminishes to thirty-five miles per hour, the intermediate speed electromagnet 71 will be deenergized, whereupon brake cylinder pressure will be reduced in the manner already described. As the speed of the vehicle diminishes to fifteen miles per hour, a further decrease in brake cylinder pressure will be effected because of the energization of the low speed electromagnet 72, which results when contact 90 engages contacts 68.

If while the vehicle is traveling above thirty-five miles per hour the rate of retardation should increase to the point where contact 111 engages contact 113, the intermediate speed electromagnet 71 will be deenergized to reduce the upper permissible limit of brake cylinder pressure, as before described. However, for speeds below thirty-five miles per hour, the retardation controller device is ineffective, as before described.

*Straight air service applications between speeds of fifteen and thirty-five miles per hour*

If at the time the brake application is initiated the vehicle is traveling above fifteen miles per hour but less than thirty-five miles per hour, the contact 89 be out of engagement with the contacts 87, and contact 90 will not have yet engaged the contacts 68. Thus both the high speed electromagnet 70 and the intermediate speed electromagnet 71 will be deenergized, while the low speed electromagnet 72 will not have yet been energized. Fluid under pressure can then be supplied to the chambers 60 and 61 only, so that the degree of brake cylinder pressure produced will bear a relation to the straight air pipe pressure in the same ratio that the area of the diaphragm 50 bears to the area of diaphragm 48. In all other respects the functioning of the parts of the brake system will be substantially the same as that heretofore described.

When the vehicle speed has diminished to approximately fifteen miles per hour, the low speed electromagnet 72 will be energized and thus release fluid under pressure from the chamber 60 to the atmosphere, by way of the choke or restriction 85. Brake cylinder pressure will then be controlled by the diaphragm 51.

It follows that if the brakes are applied when the vehicle speed is below fifteen miles per hour, diaphragm 51 only will be effective in controlling brake cylinder pressure.

It should, therefore, be apparent from the foregoing that the initial degree of application of the brakes is determined according to the speed range in which the vehicle is operating at the time of initiating the application. For the higher speeds, that is, in the speed range between sixty and one hundred miles per hour, the maximum brake cylinder pressure may be produced. In the intermediate speed range, that is, between speeds of thirty-five and sixty miles per hour, only moderately high brake cylinder pressures can be produced. In the lower speed range, that is, between fifteen and thirty-five miles per hour, only low brake cylinder pressure can be produced, while under fifteen miles per hour only very low brake cylinder pressures can be attained.

*Automatic service application*

If now it is desired to effect an automatic service application of the brakes, the selector 122 is turned to the automatic position. The brake valve handle 121 is then turned to the service position, where the brake pipe 23 is vented to the atmosphere at a service rate. When a sufficient degree of reduction in brake pipe pressure has been thus effected, the brake valve handle 121 is turned to lap position. During this manipulation of the brake valve handle the control pipe 123 remains in communication with the atmosphere.

Upon a service reduction in brake pipe pressure the automatic valve device 15 responds to effect a supply of fluid under pressure from the auxiliary reservoir 18 to the pipe 120 and volume reservoir 120a, to a degree dependent upon the degree of reduction in brake pipe pressure. Fluid under pressure supplied to the pipe 120 flows to the double check valve device 125, where it shifts the valve therein to the upper position, and flows to the straight air pipe 22. If the speed of the vehicle is at this time above sixty miles per hour, fluid under pressure flows from the straight air pipe 22 to each of the diaphragm chambers 58, 59, 60 and 61 as before. If the speed of the vehicle is less than sixty but above thirty-five miles per hour, fluid under pressure flows to all the chambers except chamber 58. If the speed is below thirty-five but above fifteen miles per hour, flow is to chambers 60 and 61 only. If the speed is below fifteen miles per hour, flow is to chamber 61 only.

Regardless of the initial speed at the time of effecting the automatic service application, it will be apparent that the speed controlled devices 11 and 12 will function as described in connection with a straight air service application to successively transfer control of brake cylinder pressure from one diaphragm to the next adjacent diaphragm to the right as the speed changes from one speed range to another. It will also be apparent that for speeds above sixty miles per hour, the retardation controller device 13 will be effective in stepping off the upper permissible limit of brake cylinder pressure in two steps, in response to two different rates of retardation; while if the speed of the vehicle is between thirty-five and sixty miles per hour, the retardation controller device will be effective in stepping off the upper permissible limit of brake cylinder pressure in one step at one rate of retardation.

To effect a release of the brakes following an automatic service application, the brake valve handle 121 is returned to release position, whereupon fluid under pressure is again supplied to the brake pipe 23 to restore the pressure therein to normal. The automatic valve device 15 then responds to the increase in brake pipe pressure to release fluid under pressure from the pipe 120, and consequently from the straight air pipe 22. This will, of course, result in a full release of fluid under pressure from the brake cylinder 10.

*Emergency application*

When it is desired to effect an emergency application of the brakes, the brake valve handle 121 is turned to the emergency position, whereupon fluid under pressure in the brake pipe 23 is released to the atmosphere at an emergency rate. At the same time, fluid under pressure is supplied to the control pipe 123 to the maximum possible degree, which will be one hundred pounds for the case assumed.

Upon an emergency reduction in brake pipe pressure, the automatic valve device 15 will respond to supply fluid under pressure from the auxiliary reservoir 18 to the pipe 120 until equalization takes place. The double check valve device 125 will, therefore, be subject on its uppermost side to fluid pressure in pipe 123 and on its lowermost side to fluid pressure in pipe 120. It is intended that the pressure in the pipe 120 shall predominate, and the double check valve device will, therefore, shift to open communication between pipe 129 and straight air pipe 22. From this point on the operation of the brake system is substantially the same as described for the full service straight air application.

To effect a release of the brakes following an emergency application, the brake valve handle 121 is returned to the release position, whereupon the brake pipe is again recharged to its normal pressure. The automatic valve device 15 then responds to the increase in brake pipe pressure to release fluid under pressure from the pipe 129, while the brake valve device 16 also releases fluid under pressure from the pipe 123. This, of course, results in a full release of the brakes.

*Modification shown in Fig. 2*

The modification shown in Fig. 2 deals with an arrangement whereby the retardation controller device 13 cooperates with the speed controlled switch device 12 to control one set of contacts.

In this figure, the speed controlled switch device is identical with that illustrated in Fig. 1. The retardation controller device 13 has, however, been modified by omitting the contacts 111, 112 and 113, and substituting therefor a lever 140 pivotally mounted on a stationary portion 141 by a pin 142. One end of the lever 140 bears against the pendulum 106 of the retardation controller, while the other end of the lever is provided with a rounded portion 143, which engages an extended end 144 of the stem 91 of the speed controlled switch device.

When the vehicle is running under power, or coasting, at a speed in excess of sixty miles per hour, the parts of the speed controlled switch device 12 will be positioned as indicated in Fig. 2. When the brakes are applied the pendulum 106 will, of course, be urged to the left under a force proportional to the rate of retardation. The parts are preferably so designed that when the vehicle speed is above sixty miles per hour, and the rate of retardation is below a predetermined desirable rate, contact 88 will be held in engagement with contacts 86, but if the rate of retardation should exceed the predetermined desired rate, then the force acting on the pendulum 106 will be sufficient, when transmitted through the arm 140, to disengage contact 88 from contacts 86. And further, if the rate of retardation should not diminish with this operation, but continues to increase, then the force acting on the arm 140 may be sufficient to also disengage contact 89 from contacts 87.

In a like manner, if the speed of the vehicle is below sixty miles per hour and the rate of retardation becomes excessive the pendulum 106 may be effective in disengaging contact 87 from the contacts 89. It will, therefore, be apparent that the sets of contacts of the speed controlled switch device are jointly controlled by the action of the fly-ball weights 97, and by the action of the retardation controller pendulum 106, the fly-ball weights controlling the contacts according to decrease in speed, and the retardation controller pendulum controlling the contacts in the event that the rate of retardation exceeds a predetermined value.

*Adaptation of invention to a train*

While the brake system embodying the invention has been illustrated as being adapted to a single vehicle only, it may be readily adapted to a train comprising a plurality of cars by merely duplicating certain of the parts shown. Each car will, of course, be equipped with one or more brake cylinders, and preferably one speed controlled valve device 11 for the brake cylinders on that car. Each speed controlled valve device may have its own speed controlled switch 12, or one such switch may be provided for all of the speed controlled valve devices.

A retardation controller device must be provided for each speed controlled switch device, and, as before indicated, only one such combination of devices is necessary for an entire train, the electromagnets of the speed controlled valve device on each car being connected to a single set of conductors extending throughout the train from the retardation controller and speed controlled switch device.

The straight air pipe and brake pipe will, of course, extend througout the train, and it is preferable that an automatic valve device 15, together with its reservoir 18, be supplied on each car. Thus it will be seen that by mere duplication of certain of the parts on succeeding cars of a train, a complete brake system results.

While I have illustrated and described my invention with reference to two embodiments thereof, it is not my intention to be limited to the exact details of these embodiments, or otherwise than by the spirit and scope of the appended claims.

Having now described my invention, what I claim as new and desire to secure by Letters Patent, is:

1. In a vehicle or train brake system, in combination, means for effecting an application of the brakes, speed controlled means for establishing a different upper limit for the degree of application of the brakes for each of a plurality of speed ranges, and means responsive to the rate of retardation of the vehicle or train for changing the limit established by said speed controlled means for a given speed range to that established by the speed controlled means for a different speed range.

2. In a vehicle or train brake system, in combination, means for effecting an application of the brakes, speed controlled means operative to establish one limit for the degree of application of the brakes for one speed range, and operative to establish a different limit for the degree of application of the brakes for a different speed range, and means operated responsive to the rate of retardation of the vehicle for causing the limit for the degree of application of the brakes for said one speed range to be changed to the limit normally established for the said different speed range.

3. In a vehicle or train brake system, in combination, means for effecting an application of the brakes, means operable to reduce the degree of application of the brakes in predetermined steps, speed controlled means for controlling said last mentioned means in a predetermined manner, and inertia operated means for also controlling said reducing means in said predetermined manner.

4. In a vehicle brake system, in combination, a brake cylinder, means for effecting a supply of fluid under pressure to said brake cylinder to effect an application of the brakes, means operable to reduce brake cylinder pressure in predetermined steps, speed controlled means for controlling the operation of said reducing means in a predetermined manner, and a retardation controller device for also controlling the operation of said reducing means in said predetermined manner.

5. In a vehicle brake system, in combination, a brake cylinder, means for effecting a supply of fluid under pressure to said brake cylinder to effect an application of the brakes, speed controlled means operative to reduce brake cylinder pressure in predetermined steps in response to predetermined decreases in vehicle speed, and inertia operated means coacting with said last mentioned means to reduce brake cylinder pressure in said predetermined steps independent of the speed of the vehicle.

6. In a vehicle or train brake system, in combination, a brake cylinder, means for effecting a supply of fluid under pressure to said brake cylinder to effect an application of the brakes, speed controlled means operative to establish different limits for brake cylinder pressure for different speed ranges of the vehicle or train, and inertia operated means for causing the limit for brake cylinder pressure for a given speed range to be changed to the limit for a different speed range.

7. In a vehicle brake system, in combination, a brake cylinder, means for effecting a supply of fluid under pressure to said brake cylinder to effect an application of the brakes, means operative when the vehicle speed reduces to a predetermined speed to reduce brake cylinder pressure by a predetermined amount, and inertia operated means operable at a predetermined rate of retardation of the vehicle occurring at vehicle speeds above said predetermined speed to reduce brake cylinder pressure by said predetermined amount.

8. In a vehicle brake system, in combination, a brake cylinder, means for effecting a supply of fluid under pressure to said brake cylinder to a chosen degree to effect an application of the brakes, means operative to reduce brake cylinder pressure in predetermined steps, speed controlled means operative as the vehicle speed diminishes to cause said last means to reduce brake cylinder pressure in said steps at predetermined vehicle speeds, and means operated by and in response to the rate of retardation of the vehicle for also causing said reducing means to reduce brake cylinder pressure in one or more of said steps.

9. In a vehicle brake system, in combination, a brake cylinder, means for effecting a supply of fluid under pressure to said brake cylinder to effect an application of the brakes, electroresponsive means operable to reduce brake cylinder pressure in steps, a plurality of electrical contacts for controlling the operation of said electroresponsive means, inertia operated means for controlling certain ones of said contacts, and speed controlled means for controlling the other of said contacts.

10. In a vehicle brake system, in combination, a brake cylinder, means for effecting a supply of fluid under pressure to said brake cylinder to effect an application of the brakes, electroresponsive means operable to reduce brake cylinder pressure in predetermined steps, two sets of contacts arranged in series for controlling the operation of said electroresponsive means, inertia operated means for controlling one of said sets of contacts, and speed controlled means for controlling the other of said sets of contacts.

11. In a vehicle brake system, in combination, a brake cylinder, means for effecting a supply of fluid under pressure to said brake cylinder to effect an application of the brakes, electroresponsive means operative to reduce brake cylinder pressure in predetermined steps, speed controlled means operative at predetermined speeds as the speed of the vehicle diminishes to cause the operation of said electroresponsive means to reduce brake cylinder pressure in said steps, and means operated according to the rate of retardation of the vehicle and operable at one or more predetermined rates of retardation to also cause the same operation of said electroresponsive means.

12. In a vehicle brake system, in combination, a brake cylinder, means for effecting a supply of fluid under pressure to said brake cylinder to effect an application of the brakes, means comprising a plurality of electromagnets and operative upon a change in the electrical condition of one or more of said electromagnets to reduce brake cylinder pressure, speed controlled means operative at successive vehicle speeds to alter the electrical condition of one or more said electromagnets, and retardation controlled means operative at one or more rates of retardation of the vehicle to also alter the electrical condition of one or more said electromagnets.

13. In a vehicle brake system, in combination, a brake cylinder, means for effecting a supply of fluid under pressure to said brake cylinder, means including at least one electromagnet operable when said electromagnet is deenergized to reduce brake cylinder pressure, speed controlled means operative at a predetermined vehicle speed to deenergize said electromagnet, and a retardation controller device operative at a predetermined rate of retardation for effecting deenergization of said electromagnet prior to operation of said speed controlled means.

14. In a vehicle brake system, in combination, a brake cylinder, means for effecting a supply of fluid under pressure to said brake cylinder to effect an application of the brakes, a retardation controller device operated according to the rate of retardation of the vehicle, speed controlled means operated according to the speed of the vehicle, and means controlled by one of said two devices, depending upon which operates first, to reduce brake cylinder pressure by a preestablished amount.

15. In a vehicle brake system, in combination, a brake cylinder, means for effecting a supply of fluid under pressure to said brake cylinder to effect an application of the brakes, means comprising a plurality of electromagnets and operative upon deenergization of one of said electromagnets to reduce brake cylinder pressure by a predetermined amount, and operative upon deenergization of another of said electromagnets to further reduce brake cylinder pressure by another predetermined amount, a speed controlled device operative at one vehicle speed to deenergize said first electromagnet and operative at a different vehicle speed to deenergize said second electromagnet, and a retardation controller device operative independently of vehicle speed to deenergize one or both of said electromagnets prior to operation of said speed controlled device.

16. In a vehicle brake system, in combination, a pipe to which fluid under pressure is supplied to effect an application of the brakes, a retardation controller device operated according to the rate of retardation of the vehicle, a speed controlled device operative according to the speed of the vehicle, means controlled by said retardation controller device and said speed controlled device for controlling the degree of application of the brakes, and a switch device operated by pressure of fluid in said pipe for controlling the effectiveness of said retardation controller device and speed controlled device.

17. In a vehicle brake system, in combination, means for controlling the degree of application of the brakes, a plurality of sets of contacts for controlling said last mentioned means, an inertia device for controlling the operation of one of said sets of contacts, a speed controlled device for controlling another of said sets of contacts, and a fluid pressure operated device for controlling the remaining of said sets of contacts.

18. In a vehicle brake system, in combination, means for effecting an application of the brakes, electroresponsive means operable to reduce the degree of application of the brakes in steps, a set of contacts for controlling the operation of said electroresponsive means, a speed controlled device for controlling the operation of said set of contacts, and a retardation controller device for also controlling the operation of said set of contacts.

19. In a vehicle brake system, in combination, a brake cylinder, means for effecting a supply of fluid under pressure to said brake cylinder to effect an application of the brakes, an electroresponsive device operable to reduce brake cylinder pressure in predetermined steps, a plurality of contacts adapted to be operated sequentially to cause the operation of said electroresponsive means to reduce brake cylinder pressure in said predetermined steps, a device operated by and according to the speed of the vehicle for operating said contacts, and a device operated by and according to the rate of retardation of the vehicle for coacting with said speed controlled device to operate said contacts.

20. In a vehicle brake system, in combination, a brake cylinder, means for effecting a supply of fluid under pressure to said brake cylinder by either straight air operation or automatic operation to effect an application of the brakes, electroresponsive means operative to reduce brake cylinder pressure in predetermined steps, a speed controlled device comprising a plurality of contacts adapted to be sequentially operated as the speed of the vehicle diminishes, a retardation controller device operated according to the rate of retardation of the vehicle and comprising a plurality of contacts adapted to be sequentially operated at different rates of retardation of the vehicle, and means so constructed and arranged that said speed controlled device contacts exercise primary control over said electroresponsive means whereas said retardation controller contacts exercise secondary control over said electroresponsive means.

21. In a vehicle brake system, in combination, means for effecting an application of the brakes, means operative upon effecting an application of the brakes for establishing a plurality of closed electrical circuits, means operative at one vehicle speed to open one of said circuits and at another vehicle speed to open the other of said circuits, a retardation controller device operative at one rate of retardation to effect opening of said first mentioned circuit and at a different rate of retardation for effecting opening of said second mentioned circuit, and means operative upon opening of said first mentioned circuit for reducing the degree of application of the brakes by one amount and operative upon opening of said second mentioned circuit for reducing the degree of application of the brakes by another amount.

22. The method of controlling a vehicle brake application, which comprises, effecting an application of the brakes, reducing the degree of application of the brakes at intervals in successive steps of a predetermined amount each as the vehicle speed diminishes and so long as the rate of retardation of the vehicle does not exceed a limiting value, and reducing the degree of application at any time by the same successive steps as required to prevent the rate of retardation from exceeding the limiting value.

23. The method of controlling the brakes for a vehicle or train, which comprises, initiating an application of the brakes, establishing the initial degree of the braking force according to the speed of the vehicle or train, and then varying the degree of braking force according to variations in the rate of retardation to establish any one of a plurality of different fixed degrees of braking force.

24. The method of controlling the brakes for a vehicle or train, which comprises, initiating an application of the brakes, limiting the initial degree of braking force to one of a plurality of different fixed degrees dependent upon the speed of the vehicle or train being within corresponding different speed ranges, and then varying the degree of braking force according to variations in the rate of retardation while the vehicle or train is traveling within a given speed range to establish other of said plurality of different fixed degrees of braking force.

25. In a vehicle or train brake system, in combination, means responsive to the speed of the vehicle or train and operable to establish any one of a plurality of certain different degrees of braking force, dependent upon the speed of the vehicle or train, and inertia means operative independently of operation of the speed responsive means to establish one of a plurality of said certain different degrees of braking force as the rate of retardation of the vehicle or train varies.

26. In a vehicle or train brake system, in combination, a brake cylinder, control means operative to cause fluid under pressure to be supplied to the brake cylinder to effect an application of the brakes, and to cause fluid under pressure to be released from the brake cylinder to release the brakes, means responsive to the speed of the vehicle or train for so controlling the control means as to cause it to establish certain different degrees of brake cylinder pressure depending upon the speed of the train, and inertia means effective independently of operation of the speed control means, upon variation in the rate of retardation of the vehicle or train, to so control the control means as to cause it to establish any one of said certain different degrees of brake cylinder pressure.

27. In a vehicle or train brake system, in combination, control means operative to establish a plurality of certain different uniform degrees of braking force in effecting application of the brakes, means responsive to the speed of the vehicle or train and operative to so control the control means as to cause it to initially establish a different one of said degrees of braking force for each of a plurality of speed ranges, and a retardation controller device for so controlling the control means, as the rate of retardation of the vehicle or train varies within each of the speed ranges, as to establish the one of said different uniform degrees of braking force corresponding to that for the next lower speed range.

28. In a vehicle or train brake system, in combination, means operative to effect application of the brakes with any one of a plurality of certain different uniform degrees of braking force, means responsive to variations in the speed of the vehicle or train, means responsive to variations in the rate of retardation of the vehicle or train, the speed-responsive means and the retardation-responsive means being cooperative for rates of retardation occurring when the speed of the train exceeds a certain speed for so controlling the brake application means as to cause it to establish a certain one of the plurality of different degrees of braking force, and cooperative for other rates of retardation occurring when the speed of the train is less than said certain speed for so controlling the brake application means as to cause it to also establish said certain one of the plurality of different degrees of braking force.

29. In a vehicle or train brake system, in combination, means, including two electroresponsive means, for controlling the degree of braking force effecting an application of the brakes, said control means being effective to establish a certain degree of braking force when both of the electroresponsive means are energized, a second certain degree of braking force lower than the first said certain degree when a certain one of the electroresponsive means is deenergized and the other electroresponsive means is energized, and a third certain degree of braking force lower than said second degree when both electroresponsive means are deenergized, and a retardation controller responsive to the retardation of the vehicle and effective to selectively control energization and deenergization of the two electroresponsive means according to the rate of retardation of the vehicle.

30. In a vehicle or train brake system, in combination, means, including two electroresponsive means, for controlling the degree of braking force effecting an application of the brakes, the brake control means being effective to establish a certain degree of braking force when both said electroresponsive means are energized, a second certain degree of braking force lower than the first said degree when a certain one of electroresponsive means is deenergized and the other electroresponsive means is energized, and a third certain degree of braking force lower than the second certain degree of braking force when both electroresponsive means are deenergized, and a retardation controller responsive to the rate of retardation of the vehicle and effective when the rate of retardation of the vehicle is less than a certain uniform rate for effecting energization of both the electroresponsive means, effective when the rate of retardation exceeds said certain uniform rate for effecting deenergization of said certain one electroresponsive means, and effective when the rate of retardation of the vehicle exceeds a second certain uniform rate higher than the first said certain uniform rate for effecting deenergization of said other electroresponsive means.

DONALD L. McNEAL.